INVENTOR.
CLARENCE L. PRITCHARD
BY Schapp & Hatch
ATTORNEYS

Aug. 5, 1969 C. L. PRITCHARD 3,459,203
VEHICLE WASHING APPARATUS
Filed Feb. 16, 1966 4 Sheets-Sheet 3

INVENTOR.
CLARENCE L. PRITCHARD
BY
Schapp & Hatch
ATTORNEYS

United States Patent Office 3,459,203
Patented Aug. 5, 1969

3,459,203
VEHICLE WASHING APPPARATUS
Clarence L. Pritchard, Castro Valley, Calif., assignor to Malsbary Manufacturing Company, Oakland, Calif., a corporation of California
Filed Feb. 16, 1966, Ser. No. 527,783
Int. Cl. B60s *3/04;* B08b *3/02, 3/18*
U.S. Cl. 134—123                  18 Claims

ABSTRACT OF THE DISCLOSURE

A vehicle washing apparatus having an arch movable along the vehicle to be washed, with liquid spraying means on the arch and power means for moving the arch along the vehicle. The spray nozzles oscillate in planes parallel to the direction of movement of the arch and means is provided for biasing the oscillating nozzles so they point generally in the direction the frame is moving during about one-half of its progress along the vehicle and then point generally away from the direction the frame is moving during the rest of its travel. Means is provided for spraying more liquid onto the ends of the vehicle than onto its midportion by halting the arch at the vehicle ends while the spray nozzles are operating.

---

This invention relates to washing apparatus, and more particularly to apparatus for automatically washing vehicles, such as automobiles.

There are many types of vehicles washing apparatus. Most of these washing devices require the vehicle to be moved along an elongated path through a series of washing and cleaning stations wherein various operations are performed. Recently, another type of apparatus has gained popularity. This type is adapted to wash a vehicle while the latter remains stationary. Most of the devices of the latter type require complicated superstructures having nozzles from which the washing liquid is sprayed. In addition to being complicated in construction, these devices often failed to perform the washing function in an adequate fashion. Moreover, these devices have been quite expensive, making it difficult for the average owner or operator of a gasoline station to acquire one.

Accordingly, one of the primary objects of the present invention is the provision of vehicle washing apparatus of the type which is adapted automatically to wash a vehicle while the latter remains stationary Another object of the present invention is the provision of apparatus of the class described which effectively sprays the cleaning liquid on the vehicle being washed.

A further object of the present invention is the provision of apparatus such as described which moves back and forth along a path to spray the cleaning liquid on a vehicle, the liquid emanating from nozzles which are moved in such a manner as to direct the liquid effectively on the vehicle.

A still further object of the present invention is the provision of apparatus of the class described which is adapted to subject the front and rear portions of the vehicle, which portions are often harder to clean than other portions of the vehicle, to longer washing periods than the other portions of the vehicle.

Another object of the present invention is the provision of apparatus of the class described which is economical in construction and reliable in operation.

Further objects and advantages of the invention will be apparent as the specification progresses, and the new and useful features of the washing apparatus will be fully defined in the claims attached hereto.

In the accompanying drawings, in which one of various possible embodiments of the invention is illustrated.

Figure 1:
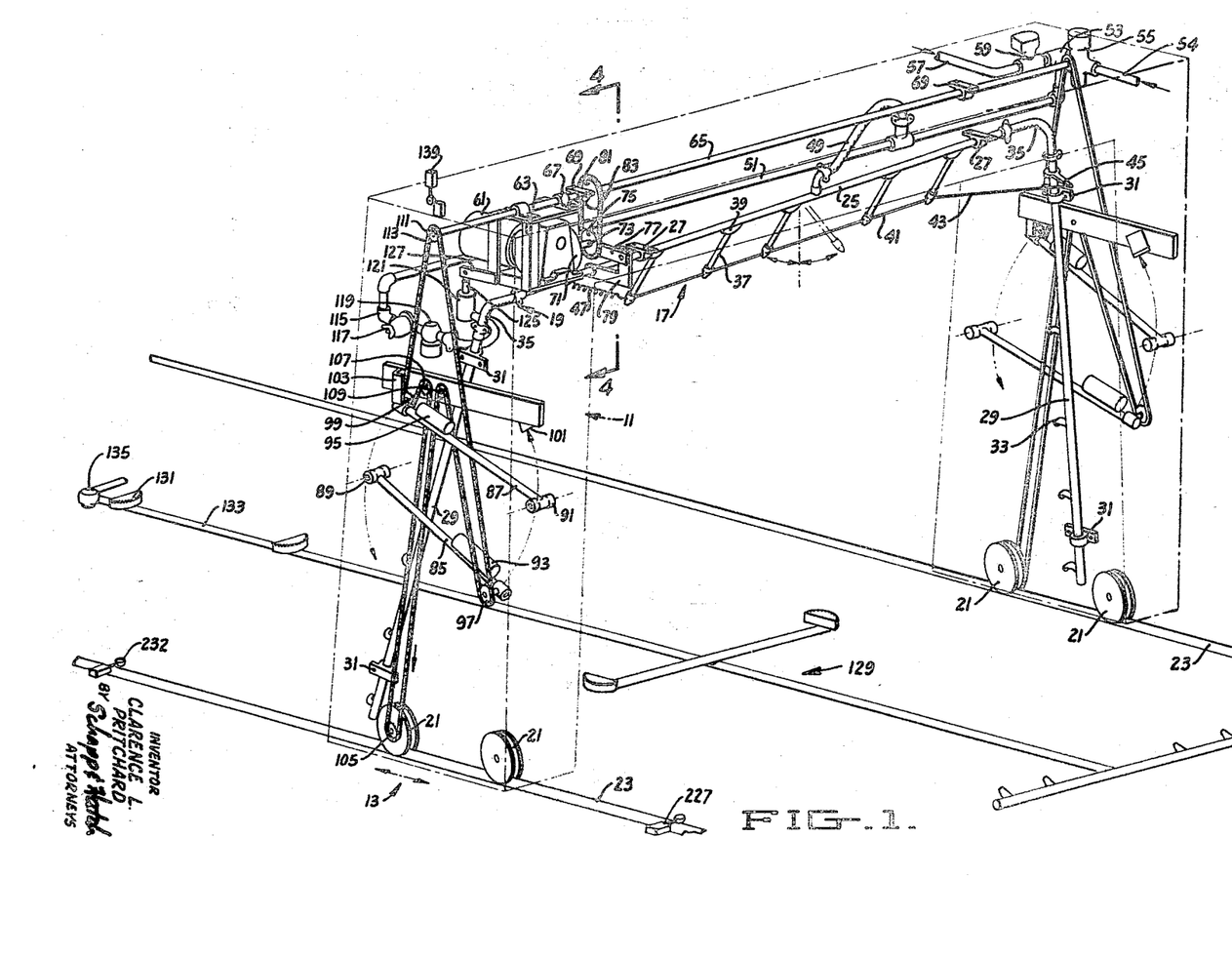
FIGURE 1 is a perspective view of the apparatus of this invention.
Figure 2:
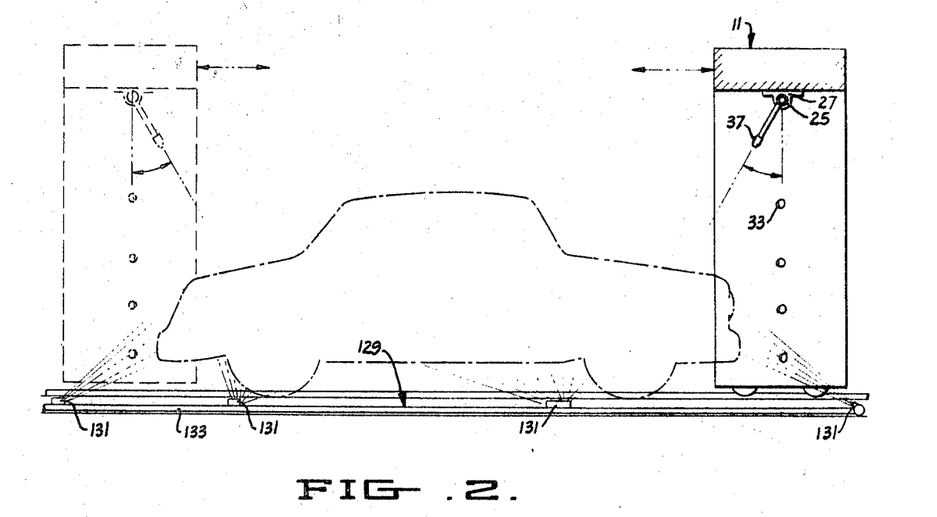
FIGURE 2 is a schematic side elevation of the apparatus illustrating two positions of the latter during a washing operation.

Referring now to the drawings, the vehicle washing apparatus of this invention is shown in FIGURE 1 to generally comprises a frame or arch 11 (shown in broken lines) adapted to straddle a vehicle, such as an automobile, means 13 mounting the frame 11 for movement back and forth along a path, power means 15 for moving the frame along the path, liquid spraying means 17 connected to frame 11 for spraying liquid on a vehicle as the frame is moved along the path, and control means 19 for directing the liquid spraying means 17 generally toward the direction the frame is moving while the latter traverses one portion of its path, and for directing the liquid spraying means generally away from the direction the frame is traveling while the latter traverses another portion of the path.

The means mounting the frame or arch 11 for movement along a path comprises wheels 21 riding on tracks 23, the latter being spaced apart from one another by a distance greater than the width of conventional automobiles. The liquid spraying means 17 includes an overhead pipe or conduit line 25 rotatably mounted in bearings 27 connected to frame 11, and side pipes or conduit lines 29 rotatably mounted in bearings 31 connected to the frame 11. Each of the side pipes 29 has a plurality of nozzles 33 thereon and is connected to overhead pipe 25 by a flxible conduit or hose coupling 35. The couplings 35 permit liquid to be conveyed from pipe 25 to side pipes 29, and at the same time transmit any rotary motion of pipe 25 to pipes 29. Overhead pipe 25 has a plurality of nozzle members 37 connected thereto by swivels 39.

As will be made apparent hereinafter, the overhead pipe 25 is adapted to be rotated back and forth through a predetermined angle. The back and forth rotation of pipe 25 is transmitted to side pipes 29 by flexible hose couplings 35, thus causing the side pipes 29 to be rotated back and forth in the same manner as pipe 25. The nozzle members 37 are connected together by an elongate member 41 which is connected by a chain 43 to the outer end of an arm 45 secured to one of the side pipes 29. It will be seen that as pipes 25 and 29 are rotated through a predetermined angle, the nozzle members 37 will be swung through a predetermined angle in a direction generally parallel to tracks 23, and also will be swung in a direction generally toward one side of the frame by the chain 43 and arm 45. A return spring 47 is connected to the outer end of elongate member 41 for returning the nozzles to the original position after the pipes 25 and 29 have swung or been rotated back to their original position. The resultant movement of the nozzle members 37 as the pipe 25 and side pipes 29 rotate back and forth through a predetermined angle is generally diagonal in direction.

Liquid is supplied to the overhead pipe 25 and side pipes 29 through a hose 49 which is connected by piping 51 to a T-coupling 53. A washing solution, such as a water-diluted detergent solution, is supplied from a source (not shown) through a hose 54 and a solenoid-operated valve 55 to one inlet of T-coupling 53. A rinsing solution, such as water, is supplied through a hose 57 and solenoid-operated valve 59 to the other inlet of T-coupling 53. As will be made apparent, the solenoid valves 55 and 59 are operated in such manner as to supply a wash solution or a rinse solution to piping 51 at predetermined times during a cleaning operation.

The overhead pipe 25 is rotated back and forth through a predetermined angle by a motor 61 which is mounted on a subframe 63 rotatably connected to a shaft 65 by bearing members 67. Shaft 65 is rotatably mounted in bearings 69 connected to frame or arch 11. A gear reduction mechanism 71 is attached to the output of motor 61 and is also mounted on subframe 63. The output shaft 73 of gear reduction mechanism 71 has a sprocket 75 attached thereto and one end of a link 77 is eccentrically connected to the sprocket. The other end of link 77 is connected to one end of an L-shaped arm 79. The other end of L-shaped arm 79 is connected to the overhead pipe 25.

When the motor 61 is operated, the drive thereof is transmitted to pipe 25 by gear reduction mechanism 71, sprocket 75, link 77, and L-shaped arm 79 in such manner as to cause the pipe 25 to be first rotated through a predetermined angle in one direction and then rotated through the same predetermined angle in the opposite direction. This movement of pipe 25 causes the nozzle members 37 to be swung back and forth through a predetermined angle. However, since the nozzle members 37 are connected together by elongate member 41 which is connected by chain 43 and arm 45 to the side pipe 29, the members 37 are pulled laterally or toward one side of the apparatus as the members 37 are swung through the predetermined angle. This causes the nozzle members 37 to be swung in the generally diagonal direction referred to previously. This diagonal swinging movement of the members 37 causes a liquid spray to be discharged from each nozzle member in a manner which gives excellent coverage of the vehicle being cleaned.

The means for driving the frame or arch 11 along tracks 23 includes a sprocket 81 connected to shaft 65 in vertical alignment with sprocket 75. A chain 83 is trained around sprockets 75 and 81 for transmitting the drive from motor 15 to shaft 65. The drive train and delaying means on both sides of the frame 11 are identical and a description of one will suffice for both. Two arms 85 and 87 are pivotally connected by cross members 89 and 91, respectively, to the frame 11. The outer ends of arms 85 and 87 have counterweights 93 and 95, respectively, attached thereto, and idler sprockets 97 and 99, respectively, rotatably mounted thereon. The arms are adapted to be swung from a first position, such as shown in FIGURE 1, to a second position wherein the outer end of arm 85 engages a stop 101 connected to frame 11 and the outer end of arm 87 has moved away from a stop 103 to a lowered position. As will be made apparent, the arms 85 and 87 provide a delaying device at opposite ends of the tracks 23 to permit a longer interval of cleaning at the forward and rearward end of the automobile, where dirt and grime are more likely to accumulate.

A sprocket 105 is connected to one of the wheels 21, sprockets 107 and 109 are attached to the frame 11, and a sprocket 111 is connected to the outer end of shaft 65. A continuous driving chain 113 is trained around sprockets 111, 97, 109, 105, 107 and 99 and back to sprocket 111. It will be seen that if the chain 113 is being driven in the direction of the arrows shown in FIGURE 1, the frame or arch 11 will be driven to the right, as viewed in FIGURE 1. When the frame 11, as it travels to the right, reaches the end of the tracks 23, the electrical circuit described hereinafter is operated to reverse the direction of drive from motor 61. The chain 113 immediately reverses in direction of travel. However, before the frame 11 is driven to the left as viewed in FIGURE 1, the outer end of arm 85 is pulled upwardly toward stop 101 and the outer end of arm 87 is permitted to drop downwardly under the weight of the counterweight 95 toward its second position. While this movement of the arms 85 and 87 takes place, the frame 11 does not move and the washing operation which is taking place remains concentrated on the end of the automobile adjacent which the frame is located. The delay caused by this apparatus may be of any reasonable length desired. As shown here, for example, the chain 113 and arms 85 and 87 are of such length that the nozzle members 37 will be swung back and forth six times during the dwell at the ends of the tracks 23. When the outer end of arm 85 hits stop 101, the slack in chain 113 is taken up, thereby causing the frame 11 to be driven to the left, as viewed in FIGURE 1. When the frame 11 reaches the other or left end of the track, as viewed in FIGURE 1, the opposite movement of arms 85 and 87 takes place to provide a delaying operation at that end of the track.

As set forth previously, the apparatus includes means 19 for directing the nozzle members 33 and 37 generally toward the direction the frame or arch 11 is moving while the latter traverses one portion of its path along tracks 23, and for directing the nozzle members 33 and 37 generally away from the direction the frame is traveling while the latter traverses another portion of the path. More specifically, this means 19 is adapted to direct the nozzle members 33 and 37 generally toward the direction the frame is moving while the latter travels approximately one-half of the distance along tracks 23, and is adapted to direct the nozzles 33 and 37 generally away from the direction the frame 11 travels while the latter travels the other half of the distance along tracks 23. This permits the nozzles 33 and 37 to be swung toward the end of the automobile which is farthest from the frame 11 substantially at all times while the frame travels over the automobile, i.e., this permits the nozzle members 33 and 37 to be swung generally toward the end of an automobile which is farthest away from the frame 11 both while the frame passes over approximately the first one-half of the automobile and while the frame passes over approximately the second half of the automobile.

The means 19 includes piping 115 connected to the outer end of pipe 51. A pressure regulator 117 and solenoid-operated valve 119 are provided in piping 115. The end of piping 115 is attached to a cylinder 121 connected to frame 11. A piston 123 in the cylinder is adapted to be moved upwardly when liquid is forced through pipe 51 and piping 115 to the lower end of the cylinder 121. Piston 123 is connected by a rod 125 to an arm 127 attached to subframe 63.

Figure 3:
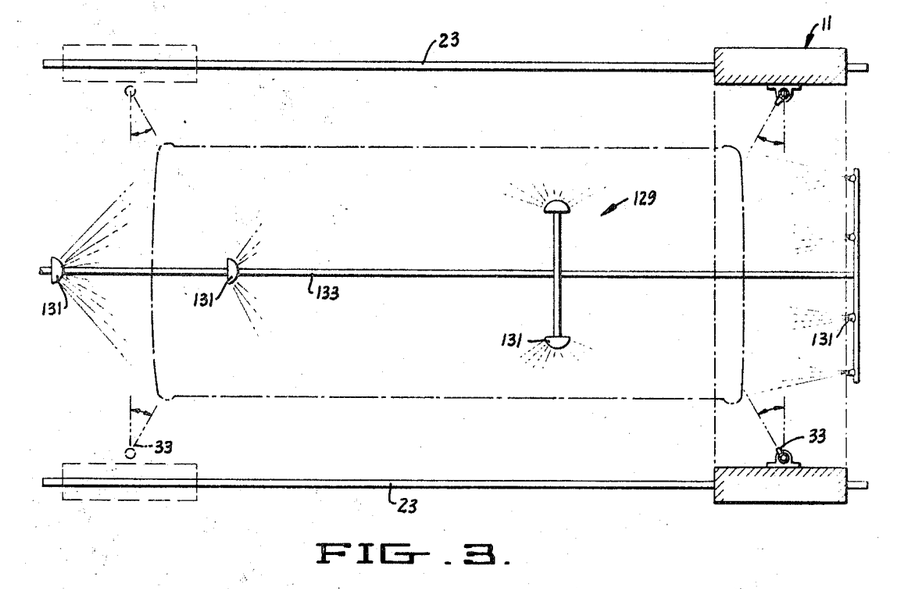
FIGURE 3 is a plan view of FIGURE 2.
Figures 4, 6:
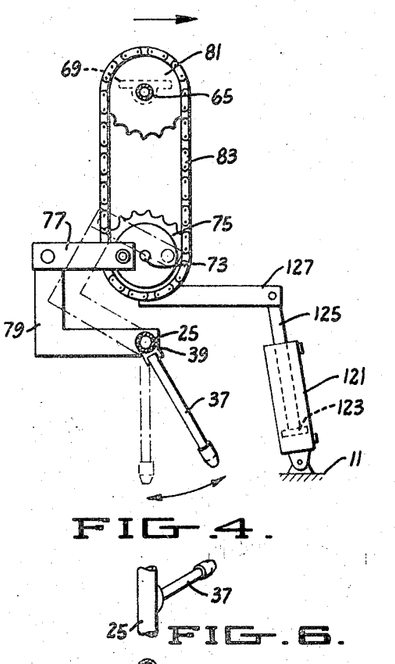
FIGURE 4 is an enlarged section taken along line 4—4 of FIGURE 1, illustrating the position of certain parts of the apparatus while the latter traverses one portion of its path.
FIGURE 6 is a plan view of one nozzle of the invention in one position while the apparatus moves through one portion of its path.
Figures 5, 10:
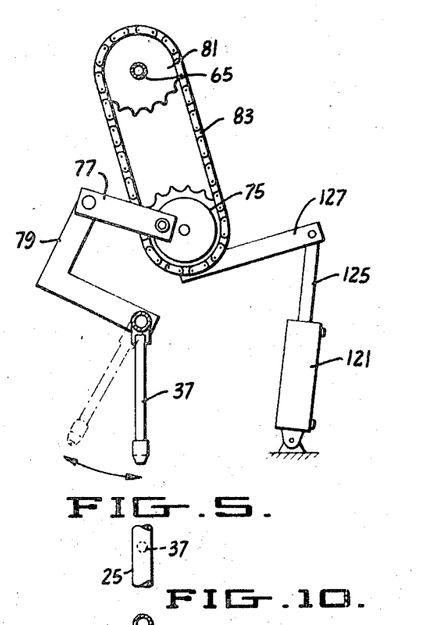
FIGURE 5 is a view similar to FIGURE 4 illustrating a fragment of the apparatus while the latter traverses a second portion of its path.
FIGURE 10 is a plan view of the nozzle shown in FIGURE 6 in a third position while the apparatus moves through a second portion of its path.

When liquid under pressure passes through piping 115 to the lower end of cylinder 121, the piston 123 and rod 125 are raised, causing the subframe 63 to pivot from the position shown in FIGURES 1 and 4 to the position shown in FIGURE 5. This causes the pipe 25 and nozzle members 37 to be swung from the position shown in FIGURES 4, 6 and 7 to the position shown in FIGURES 5, 10 and 11. As will be made apparent, the piston is allowed to pass to the lower end of cylinder 121 by opening solenoid valve 119 after the frame or arch 11 has traveled approximately one-half of the distance along tracks 23. More particularly, assuming the frame 11 is at one end of the tracks 23 and its direction of movement is in the direction of the arrow in FIGURE 4, the nozzle members 37 will be swung back and forth between the position shown in FIGURES 6 and 7 and the position shown in FIGURES 8 and 9, and the nozzle members 33 will be swung back and forth through the arc shown at the right-hand end of FIGURE 3, as the frame travels to a point approximately half way along the tracks 23. Thus, streams of the solution emitting from the nozzle members 37 are directed toward the vehicle.

After the frame 11 has traveled approximately half way along the tracks 23, a switch, such as switch 139, mounted in a position to be actuated by the frame 11, is actuated to energize solenoid valve 119 and open the latter. Liquid then flows through pipe 51, piping 115, and to the lower end of the cylinder 121, thereby causing the subframe 63 to be shifted to the position shown in FIGURE 5. This causes the overhead pipe 25 and nozzle members 37 to be shifted from the position shown in FIGURES 6 and 7 to the position shown in FIGURES 10 and 11 and also causes the side pipes 29 to be rotated the same amount as overhead pipe 25. As the frame moves along the second half of the distance along tracks 23, the drive from motor 61 through sprocket 75, link 77 and L-shaped arm 79 to the overhead pipe 25 causes the latter and its associated nozzle members 37 to be moved back and forth from the position shown in FIGURES 10 and 11 to the position shown in FIGURES 12 and 13, and the nozzle members 33 to be swung back and forth through the arc shown at the left-hand end of FIGURE 3.

It will thus be seen that even though the frame or arch 11 is moving away from the center of the vehicle or automobile during the latter half of the frame's movement along tracks 23, the nozzle members 33 and 37 are swung in such a direction as to direct the liquid sprayed therefrom toward the distal end of the automobile, thereby providing an effective cleaning operation. After the frame 11 has reached the end of the track, and after it has been delayed due to the operation of the arms 85 and 87, it begins its movement back along the track. The subframe 63 is maintained in its FIGURE 5 position and the nozzle members 37 are moved between the position shown in FIGURES 10 and 11 and the position shown in FIGURES 12 and 13 until the frame has reached the half way point to actuate the solenoid valve 119 to a closed position, thereby permitting the weight of the subframe to return the apparatus to the position shown in FIGURE 4. In this regard, it will be understood that suitable relief means is provided to permit the piston 123 to return to its lower position in cylinder 121.

Figure 7:
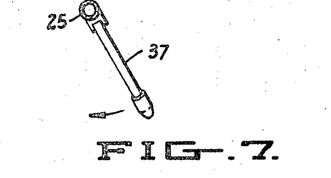
FIGURE 7 is an elevation of FIGURE 6.
Figure 8:
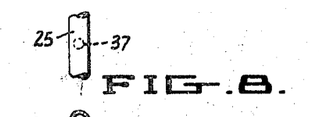
FIGURE 8 is a plan view of the nozzle shown in FIGURE 6 in a second position while the apparatus moves through the said one portion of its path.
Figure 9:
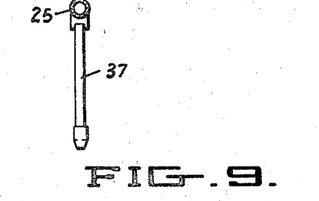
FIGURE 9 is an elevation of FIGURE 8.

As the arch 11 is returning to its original position after solenoid valve 119 has been closed, the nozzle members 37 are moved back and forth between the position shown in FIGURES 6 and 7 and the position shown in FIGURES 8 and 9. Other switches, not shown on the drawings of the mechanical features of the apparatus, are described with reference to and shown in the electrical circuit controlling the operation of the apparatus.

A stationary undercarriage washing apparatus is indicated generally at 129. This apparatus contains a plurality of nozzles 131 connected by piping 133 for spraying the undercarriage and the forward and rearward chrome areas. The undercarriage piping 133 is connected to a source of washing solution under pressure and, as will be made apparent hereinafter with respect to the electrical circuit for the apparatus, has a solenoid 242 operating a valve 135 which determines the flow of washing solution to the undercarriage washing apparatus 129.

The washing apparatus of this invention is particularly adapted for use in an automatic car washing system wherein a person desiring to have his car washed first deposits a specified sum of money in a coin collecting mechanism and then drives his automobile to a predetermined position under the arch 11 and between tracks 23. The operation of the apparatus and a description of the circuit controlling the operation of the apparatus will be described in relation to such a system.

Figure 14:
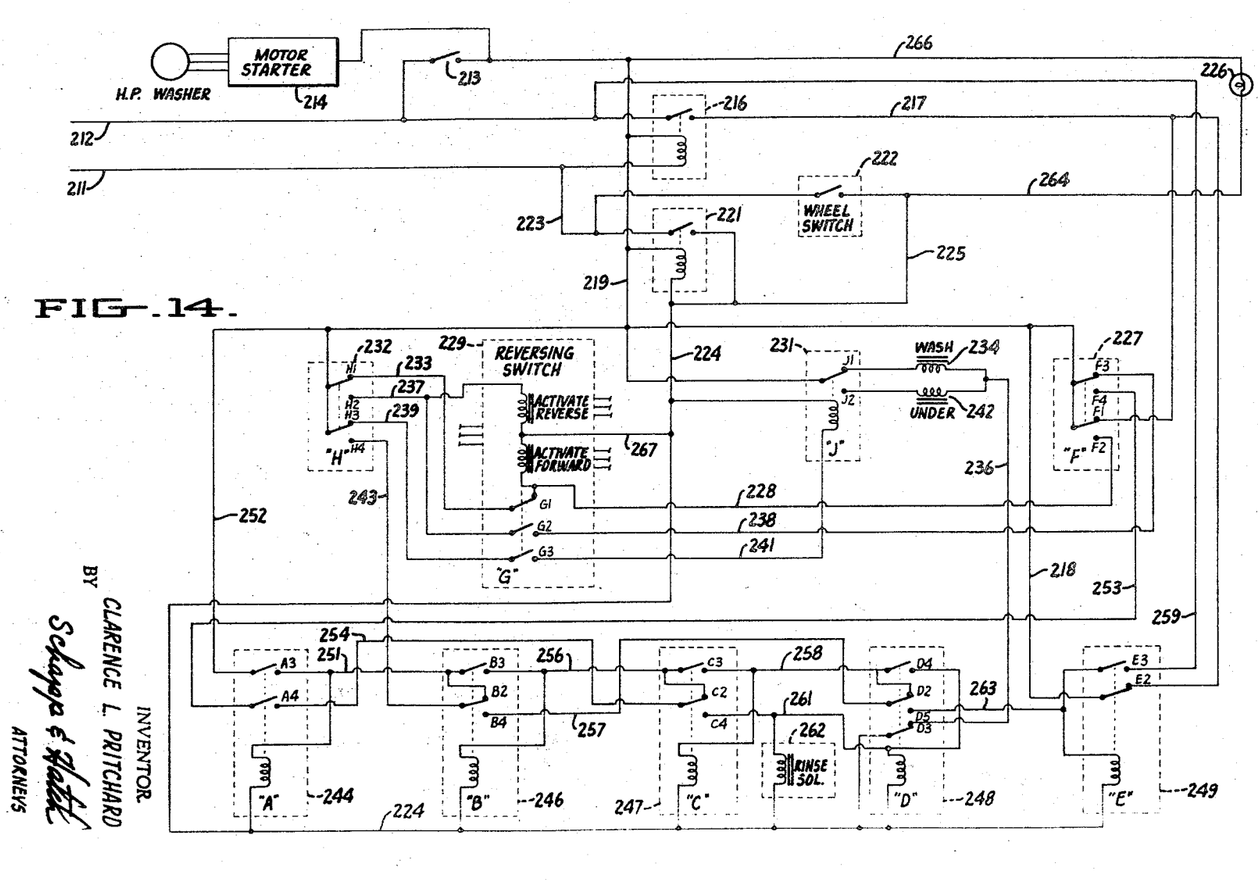
FIGURE 14 is an electrical circuit diagram of the apparatus.

Referring to FIGURE 14, it will be seen that power is supplied to the electrical control circuit on power lines 211 and 212. Line 212 is connected to a momentary contact, normally open, coin-actuated switch 213. The driver or operator of the car first deposits the necessary money to close switch 213.

Closure of switch 213 supplies power to a magnetic motor starter 214 to start the motor of the high pressure washer W which supplies water under a high pressure to the pipes 54, 57 and 133. Suitable cleansing agents may be added to pipes 54 and 133 to provide a washing solution. Closure of switch 213 also supplies power to the actuating coil of a relay 216, causing relay 216 to close, thereby supplying power from line 212 along a line 217 through a normally closed contact E2 of a relay E, through a line 218 and a line 219 back to the actuating coil of relay 216, causing relay 216 to remain energized even after switch 213 reopens. Power is also supplied along the path just mentioned through lines 217, 218 and 219 to one side of the actuating coil of a relay 221. The operator drives the car forward between tracks 23 and under arch 11, which is located at one end of the tracks. When the car is positioned properly for initiation of the washing cycle, one of its wheels actuates a wheel switch 222 to supply power from line 211 along lines 223 and 225 to the other side of the coil of relay 221, thus energizing it. Energization of relay 221 closes its normally open contacts to supply power from line 211 along line 223 through the contacts of relay 221 to line 224 to initiate the further operations of the control circuit, and to energize a signal lamp 226 along a line 264 to signal the operator of the car to bring the car to a halt at that position. Power is supplied to the other side of signal lamp 226 from line 219 along a line 266. Note that relay 221 is locked in by the presence of power on line 224.

At the start of the cycle of operations, arch 11 is in its first extreme position of travel. A wash solenoid 234, which opens valve 55, is supplied with power after closure of relay 221 along a line 236 through a contact D3 of a relay D to line 224 and from line 219 through a normally closed contact J1 of a relay 231, also designated in the circuit drawing as J. Operation of wash solenoid 234 permits the flow of the washing solution through the nozzles 33 and 37 on arch 11 for washing the upper and side surfaces of the car. When the arch 11 is in its first extreme position of travel, it actuates a double-pole, double-throw switch 227, also designated as F in the circuit drawing. Actuation of switch 227 by arch 11 closes a normally open contact F2 of switch 227 to supply power from lines 218 and 219 along a line 228 to one input of a reversing switch 229. Reversing switch 229 is connected to arch drive motor 61. Switch 229 is here shown as being of the type which is positively actuated into either the forward or reverse mode and supplies no power to arch drive motor 61 when it is not positively actuated into one or the other of those modes. However, it must be appreciated that a reversing switch having no "off" position, but rather being in either "forward" or "reverse" mode at all times, would be equally effective. The reversing switch may be of any type appropriate to reversal of arch drive motor 61 through external switching, and having the additional contacts arranged as mentioned below. Line 228 is coupled to that input of reversing switch 229 which causes the arch drive motor 61 to drive the arch 11 in the direction arbitrarily designated as "forward." However, prior to moving, the arms 85 and 87 are swung from one position to another by chains 113. Although the arch is delayed against movement by arms 85 and 87, the overhead pipe 25 is being rotated back and forth by its connection to motor 61. Thus, the nozzles 37 are diagonally swept back and forth to spray washing solution on the adjacent end of the car.

Reversing switch 229 is also designated by the letter G in the circuit drawing and has, in addition to the contacts necessary for reversing arch drive motor 61, single-pole single-throw contacts G1, G2 and G3 arranged for actuation to open and closed positions upon actuation of the reversing switch in a manner detailed below. The sides of the "forward" and "reverse" actuating coils of reversing switch 229 opposite those sides connected to lines 228 and 237 are connected to power line 224 along a line 267.

A double-pole double-throw switch 232, also designated as H in the circuit drawing, is arranged for actuation by arch 11 at a second extreme position of travel of the arch, opposite that at which switch 227 is actuated. As arch 11 begins to move away from the first extreme position, in which it actuated switch 227, contact F2 opens, terminating flow of power along line 228 to the "forward" actuating coil of reversing switch 229. However, contact G1 of reversing switch 229 closes when the reversing switch is actuated into the forward mode, and its closure supplies power from line 219 through a normally closed content H1 of switch 232 along a line 233 to the "forward" actuating input of reversing switch 229 to lock the reversing switch in the forward mode.

As the arch begins its movement down tracks 23, the nozzle members 37 are operated as described above to be moved back and forth between a location in a generally vertical plane and a position located in a plane inclined away from the far end of the automobile, i.e., the nozzle members 37 are moved between a generally vertical position and a position wherein they are generally pointed towards the opposite end of the automobile. When the half way point along the tracks is reached by the arch 11, switch 139 is actuated to open the solenoid-operated valve 119 and permit liquid to be delivered to the lower end of cylinder 119. As described previously, this operation causes the subframe 63 to move from its FIGURE 4 position to its FIGURE 5 position, thus moving the nozzle members 37 from the position shown in FIGURES 6 and 7 to the position shown in FIGURES 10 and 11.

Figure 11:
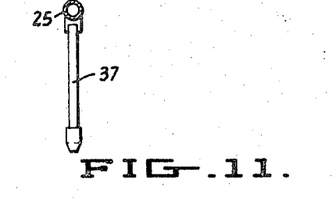
FIGURE 11 is an elevation of FIGURE 10.
Figure 12:
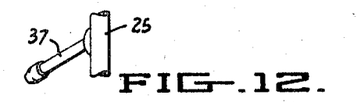
FIGURE 12 is a plan view of the nozzle shown in FIGURE 10 in a fourth position while the apparatus moves through the said second portion of its path.
Figure 13:
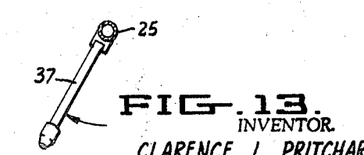
FIGURE 13 is an elevation of FIGURE 12.

As the arch 11 traverses the second half of the first pass along the tracks 23, the nozzle members 37 are swung from the position shown in FIGURES 10 and 11 to the position shown in FIGURES 12 and 13. Thus, the nozzle members 37 are swung from a first position located in a generally vertical plane to a second position located in a plane inclined away from the end of the automobile which is farther away from the arch 11, i.e., the nozzle members 37 are swung from a generally vertical position to a position wherein they are directed generally toward the far end of the automobile. Thus, during the movement of the arch from one end of the tracks to the other end, the nozzle members 37 are always swung toward the more remote end of the automobile, regardless of the direction in which the arch is moving.

While reversing switch 229 has been in its forward mode, it has been actuating arch drive motor 61 to drive arch 11 in the first pass, from the first extreme position toward its second extreme position. Upon arrival at its second extreme position, arch 11 actuates a switch 232 (H). Actuation of switch 232 opens normally closed contact H1, interrupting the supply of power along line 233 through contact G1 to the "forward" actuating coil of reversing switch 229. As no power is being supplied on line 228 at this time, due to open contact F2 in switch 227, reversing switch 229 drops out of the forward mode, causing arch drive motor 61 to terminate its forward drive. Actuation of switch 232 also closes a contact H2 supplying power from line 219 along a line 237 to the "reverse" actuating coil of reversing switch 229, causing reversing switch 229 to reverse the direction of arch drive motor 61. The arms 85 and 87 are first swung to their opposite positions by chain 113. After the arms are set in their new position, the chain 113 causes arch 11 to begin traveling back in its second pass, toward its first extreme position.

Actuation of reversing switch 229 into the reverse mode opens contact G1 and closes contacts G2 and G3 in reversing switch 229. Contact G1 is opened to prevent the reclosure of contact H1 in switch 232 from once again supplying power to the "forward" actuating coil of reversing switch 229. Closure of contact G2 locks in the "reverse" actuating coil of reversing switch 229 by supplying power from line 219 through normally closed contact F3 of switch 227 and along a line 238 to the "reverse" actuating coil of reversing switch 229. Closure of contact G3 by the actuation of reverse mode of switch 229, together with the reclosure of normally closed contact H3 of switch 232 as arch or frame 11 beings to travel back on its second pass toward its first extreme position, supplies power from line 219 through contact H3 along a line 239, through contact G3 and thence along a line 241 to the coil of relay 231. As the opposite end of the coil of relay 231 is connected to power line 224, supply of power along line 241 will actuate relay 231 to open contact J1 and close a contact J2, thereby terminating the wash by interrupting power to the wash solenoid 234, causing valve 55 to close, and at the same time powering undercarriage solenoid 242 to open valve 135, thereby permitting washing solution to be supplied to undercarriage apparatus 129 for washing the underside of the car during this second pass. During the first half of the movement of arch 11 in the second pass, the subframe 63 is maintained in the FIGURE 5 position and the nozzle members 37 are swung toward the more remote end of the automobile. However, since valve 55 and 59 are closed, no liquid is being discharged from the nozzles 33 or 37. After the arch reaches the half way point of its travel during the second pass, the solenoid valve 119 is opened to permit the subframe 63 to return to its FIGURE 4 position, thus causing the nozzle members 37 to move between the position shown in FIGURES 6 and 7 and the position shown in FIGURES 8 and 9. This switch in the movement of the nozzle members 37 at the half way point during travel of the arch 11 along tracks 23 continues through the remainder of the operation described hereafter. However, no solution is discharged from the nozzles 37 during this second pass, nor will any solution be discharged from the nozzles 37 during the fourth pass, as described hereafter.

Actuation of switch 232 by arch 11 at the end of the first pass also closes normally open contact H4 supplying power from line 219 along a line 243 through a normally closed contact B2 of a relay 246, also designated on the circuit diagram as B, and from there along a line 251 to one end of the coil of a relay 244, also designated on the circuit diagram as A. As the other end of the coil of relay 244 is already supplied with power along power line 224, relay 244 will be actuated and contacts A3 and A4 will be closed. Closure of contact A3 supplies power along a line 252 from line 219 to the coil of relay 244 to lock it in.

When arch 11 reaches its first extreme position at the end of the second pass and actuates switch 227 again, normally closed contact F3 of switch 227 is opened, terminating the supply of power from line 219 through contact F3 along line 238 through contact G2 to the "reverse" actuating coil of reversing switch 229. As no power is being supplied along line 237 due to the open contact H2 in switch 232, reversing switch 229 will drop out of the reverse mode. Actuation of switch 227 by arch 11 also closes normally open contact F2, supplying power from line 219 through contact F2 along line 228 to the "forward" actuating coil of reversing switch 229 to actuate the reversing switch into its forward mode. Actuation of reversing switch 229 into the forward mode again closes contact G1, as described above in connection with the first pass, to lock the reversing switch in the forward mode.

Actuation of switch 227 also closes normally open contact F4 to supply power from line 219 along a line 253 to contact A4 in relay 244. As relay 244 has already been actuated and locked in, contact A4 is already closed so the power continues along a line 254 through normally closed contact C2 of relay 247, also designated in the circuit drawing as C, and from there along a line 256 to one end of the coil of a relay 246, also designated in the circuit drawing as B, to actuate it. Actuation of relay 246 closes contacts B3 and B4 and opens contact B2; closure of contact B3 locks in relay 246 by supplying current to its coil along lines 251 and 252.

The actuation of reversing switch 229 into the forward mode at the end of second pass by the closure of contact F2 in switch 227 also opens contacts G2 and G3 of reversing switch 229. The opening of contact G2 prevents the reclosure of contact F3 in switch 227 from supplying power along line 238 to the "reverse" actuating coil of reversing switch 239. The opening of contact G3 terminates the supply of power from line 219 through contact H3 of switch 232 along lines 239 and 241 to relay 231. Relay 231 then is de-energized so that contact J2 is opened and contact J1 is closed, thereby de-activating the undercarriage solenoid 242 and activating the wash solenoid 234 to once again spray washing solution from nozzles 33 and 37 onto the top and sides of the car. It will thus be noted that the undercarriage solenoid 242 has been actuated only from the time the arch 11 leaves its second extreme position until it arrives at the first or original position. The wash solenoid 234 is actuated during the delay or dwell period at both ends of the arch travel. This is because it is more desirable to spray the wash solution on the forward and rearward ends of the car than it is to wash the underside of the car.

At the end of the third pass, when arch 11 reaches its second extreme position and arctuates switch 232, contact H1 of switch 232 is opened, interrupting the supply of power along line 233 through contact G1 of reversing switch 229, which has been holding the reversing switch in the forward mode. At the same time, contact H2 of switch 232 is closed, supplying power from line 219 along line 237 to the "reverse" actuating coil of reversing switch 229. In the same manner as set forth above in connection with the second pass, actuation of reversing switch 229 into the reverse mode of operation opens contact G1 and closes contacts G2 and G3 to lock reversing switch 229 in the reverse mode through the supply of power through contact F3 in switch 227 on line 238 and to actuate relay 231 to close contact J2 and open contact J1 so that on the fourth pass, when arch 11 permits H3 to reclose, the undercarriage solenoid 242 is once again actuated to initiate washing the underside of the car and wash solenoid 234 is de-energized.

Actuation of switch 232 at the end of the third pass also closes normally open contact H4 to supply power from line 219 along line 243 through normally open contact B4 of relay 246 and from there along a line 257 to a normally closed contact D2 of a relay 248, also designated as D in the circuit drawing, and from contact D2 along line 258 to the coil of relay 247 to actuate relay 247.

Actuation of relay 247 closes normally opened contact C3 to supply power to the coil of relay 247 along lines 252, 251 and 256 to lock in relay 247. At the end of the fourth pass, arch 11 has returned to its first extreme position, at which it actuates switch 227. In the same fashion as at the beginning of the third pass, actuation of switch 227 at the end of the fourth pass opens normally closed contact F3 to terminate the supply of power along line 238 through lock-in contact G2 of reversing switch 229 to the "reverse" actuating coil of reversing switch 229, and closes normally open contact F2 to supply power along line 228 to the "forward" actuating coil of reversing switch 229.

Similarly to the third pass, actuation of the reversing switch to the forward mode again closes contact G1 and opens contacts G2 and G3 to lock the reversing switch in the forward mode through supply of power along line 233 from contact H1 and to prevent the supply of power to the "reverse" actuating coil of reversing switch 229 along line 238 upon reclosure of contact F3. Contact F4 is also closed by actuation of switch 227 to supply power along line 253 through contact A4 to line 254 and thence through normally open contact C4 to the coil of relay 248 along line 261. Actuation of relay 248 closes normally open contact D4 to supply power to relay 248 to lock it in along lines 258, 256, 251 and 252. Actuation of relay 248 also opens contacts D2 and D3 and closes contact D5. The opening of contact D3 terminates the supply of power along line 236 to wash solenoid 234 and undercarriage solenoid 242, so that after actuation of relay 248, neither of these solenoids is actuated by closure of either contact J1 or J2. The supply of power along line 261 which actuated relay 248 also actuates rinse solenoid 262 to open valve 59. Actuation of rinse solenoid 262 provides a spray of rinse water from the arch through nozzles 33 and 37 to the top and sides of the car as arch 11 travels toward its second extreme position on the fifth pass.

When arch 11 has reached its second extreme position at the end of the fifth pass, it actuates switch 232 to open contact H1 and closes contact H2, thereby actuating reversing switch 229 into the reverse mode in a fashion similar to that taking place at the start of passes 2 and 4, except that the wash and undercarriage solenoids 234 and 242 remain disabled as they were on the fifth pass by the opening of contact D3 in relay 248, and rinse solenoid 262 remains actuated as it is in parallel with the coil of relay 248 which is locked in through lines 258, 256, 251 and 252. Thus, the sixth pass of arch 11 back toward its first extreme position is, like the fifth pass, a rinse only.

Actuation of switch 232 (H) at the end of the fifth pass also closes contact H4 to supply power along line 243 through contact B4, along line 257 and through normally open contact D5 of relay 248 (D) to line 263, and thence to the coil of relay 249, also designated in the circuit drawing as E. Relay 249 is actuated thereby to close contact E3 and open contact E2. Closure of contact E3 locks in relay 249 through the supply of power along line 259 from line 217.

During the sixth pass, power has been supplied to power line 219 through contact F1 of switch 227, as contact E2 of relay 249 was open, blocking power supply along line 218. When arch 11 returns to its first extreme position at the end of the sixth pass, the actuation of switch 227 opens contact F1, terminating the supply of power to line 219, and causing the de-activation of relays 216 and 221 and all of the remaining relays. The control circuit is thereby returned to its initial state, ready for reactivation by the next car and the closure of coin-activated switch 213.

It will be seen that a complete car washing operation includes the following sequential steps:

First, the arch travels down the length of the tracks 23 with a washing solution, such as a detergent and water solution, being emitted from the nozzle members 33 and 37. The washing solution is discharged from the nozzle members while the arch dwells at the end of the tracks 23 and is terminated when the arch begins its movement back along the tracks.

During the movement of the arch back along the tracks, the undercarriage washing apparatus 129 is operated to spray a washing solution on the bottom of the car and on the front and rear ends of the car until the arch 11 arrives back at its original position. As soon as it arrives at this position, the spray from the undercarriage washing apparatus 129 is discontinued and the washing solution is discharged from the nozzle members 33 and 37. After the dwell of the arch at its original position, the arch again moves along the tracks 23, emitting the wash solution from the nozzles 33 and 37.

The arch travels down the tracks to its second position and during the dwell continues to emit the wash solution from the nozzles 33 and 37. As the arch begins its movement back along the tracks toward its original position, the discharge of wash solution from nozzles 33 and 37 is terminated and the undercarriage apparatus 129 is operated to spray the wash solution on the bottom of the car and on the front and rear ends of the car again.

Upon arrival of the arch back at its original position, the spray from the undercarriage washing apparatus 129 is discontinued. At this time, a rinsing solution is discharged from the nozzles 33 and 37, and after the dwell at its original position, the arch moves down along the tracks 23 toward the other end thereof. The rinse solution is discharged from the nozzles 33 and 37 while the arch dwells at its second extreme position and continues as the arch moves back toward its original position. Upon arrival of the arch at its original position, the discharge of rinse solution from the nozzles 33 and 37 is discontinued and the operation of the apparatus is also automatically discontinued. The apparatus is then ready for another cleaning operation.

During the movement of the arch back and forth along the tracks 23, the nozzle members 33 and 37 have been swung in such a manner that during approximately one-half of the movement of he arch along the tracks, the nozzle members have been swung generally toward the direction the arch is moving, i.e., the nozzle members 33 and 37 have been swung toward the end of the automobile opposite from the end at which the arch started its movement.

During the second half of the movement of the arch during one pass thereof, the nozzle members 33 and 37 have been swung generally away from the direction the arch is traveling, i.e., the nozzle members 33 and 37 are swung in a direction generally toward the end of the automobile adjacent which the arch started its movement.

The diagonal swinging of the nozzle members 37 provides an effective spraying operation to clean and wash the automobile. This diagonal movement of the members 37 provides a better and more concentrated cleaning action than would occur if the nozzle members 37 were merely fixed in one position or swung in a generally vertical plane parallel with the tracks 23.

It will thus be seen that the apparatus of this invention is adapted to move back and forth along a path to spray the cleaning liquid on the vehicle, with the liquid emanating from nozzle members which are moved in such a manner as to direct the liquid effectively on the vehicle for cleaning the latter. Moreover, the apparatus of this invention is completely automatic in operation and does not require any operating personnel to be in the area. Furthermore, it will be noted that the apparatus is adapted to subject the front and rear portions of the automobile, which portions are often harder to clean than other portions, to longer washing periods.

As various changes could be made in the above constructions without departing from the scope of the invention, it is intended that all matter contained in the above description or shown in the accompanying drawings shall be interpreted as illustrative and not in a limiting sense.

I claim:

1. Vehicle washing apparatus comprising a frame adapted to straddle a vehicle, means mounting said frame for movement along a path, power means for moving said frame along said path, liquid spraying means connected to said frame for spraying liquid on a vehicle as said frame moves along said path, said control means for directing said liquid spraying means generally toward the direction said frame is moving while the latter traverses one portion of said path, and for directing said liquid spraying means generally away from the direction said frame is traveling while the latter traverses another portion of said path.

2. Vehicle washing apparatus as set forth in claim 1 wherein said liquid spraying means includes an overhead line adapted to extend over the top of a vehicle, a plurality of nozzles connected to said line, and means for supplying liquid to said line, said control means including means for rotating said overhead line a predetermined amount after said frame was traversed said one portion of said path.

3. Vehicle washing apparatus as set forth in claim 2 wherein said control means includes means for rotating said overhead line back and forth through a predetermined angle while the frame moves along said path.

4. Vehicle washing apparatus as set forth in claim 3 further including means for swinging said nozzles back and forth in a direction generally toward one side of said frame.

5. Vehicle washing apparatus as set forth in claim 2 wherein said liquid spraying means includes two side lines extending downward from points adjacent opposite ends of said overhead line, a plurality of nozzles connected to said side lines, said lines being mounted for rotational movement, and flexible connecting conduit means joining said side lines to said overhead line for permitting liquid to flow from the overhead line to the side lines and for rotating said side lines a predetermined amount when said overhead line is rotated a predetermined amount.

6. Vehicle washing apparatus as set forth in claim 1 wherein said power means includes reversible motor means, reversing means at opposite ends of said path for initiating reversal of said motor means upon arrival of said frame at each end of said path, a drive wheel connected to said frame, and drive train means drivingly connecting said motor means to said drive wheel, said drive train means including means for delaying movement of said frame after said motor means has been reversed by actuation of said reversing means.

7. Vehicle washing apparatus as set forth in claim 6 wherein said liquid spraying means includes an overhead line adapted to extend over the top of a vehicle, a plurality of nozzles connected to said line, and means for supplying liquid to said line, said control means including means for rotating said overhead line a predetermined amount after said frame has traversed said one portion of said path.

8. Vehicle washing apparatus as set forth in claim 7 wherein said control means includes means for rotating said overhead line back and forth through a predetermined angle while the frame moves along said path.

9. Vehicle washing apparatus as set forth in claim 8 further including means for swinging said nozzles back and forth in a direction generally toward one side of said frame.

10. Vehicle washing apparatus as set forth in claim 6 wherein said liquid spraying means includes an overhead line adapted to extend over the top of a vehicle, a plurality of nozzles connected to said line, and means for supplying liquid to said line, said control means including means for rotating said overhead line a predetermined amount after said frame has traversed said one portion of said path.

11. Vehicle washing apparatus as set forth in claim 10 wherein said liquid spraying means further includes two side lines extending downward from points adjacent opposite ends of said overhead line, a plurality of nozzles connected to said side lines, said lines being mounted for rotational movement, and flexible connecting conduit means joining said side lines to said overhead line for permitting liquid to flow from the overhead line to the side lines and for rotating said side lines a predetermned amount when said overhead line is rotated a predetermined amount.

12. Vehicle washing apparatus as set forth in claim 11 wherein said control means includes means for rotating said overhead line back and forth through a predetermined angle while the frame moves along said path.

13. Vehicle washing apparatus as set forth in claim 6 wherein said drive wheel has a sprocket thereon, said means for delaying movement of said frame including first and second arms pivotally connected to said frame, each of said arms having an idler sprocket rotatably connected to the outer end thereof, said drive train means comprising a chain trained around said idler sprockets and said sprocket on said drive wheel, said idler sprockets being on opposite sides of said sprocket on said drive wheel with respect to said chain, each of said arms being adapted to be swung between a first driving position to a second idling position, one of said arms being in said first position and the other arm being in said second position as said frame moves along said path, said arms being swung to their other positions upon reversal of said motor means.

14. Vehicle washing apparatus comprising a frame adapted to straddle a vehicle, means mounting said frame for movement along a path, power means for moving said frame along said path, liquid spraying means connected to said frame for spraying liquid on a vehicle as said frame moves along said path, said power means including reversible motor means adapted to be driven continuously in one direction or the other for moving said frame back and forth along said path, reversing means for reversing said motor means upon the arrival of said frame at each end of said path, and delaying means for delaying the return of said frame after it has arrived at each end of said path and actuated said reversing means so as to spray liquid onto the ends of the vehicle for a predetermined time, the liquid spraying means being operative to spray liquid onto the ends of the vehicle during such delay whereby the ends of the vehicle will receive more liquid than the midportion.

15. Vehicle washing apparatus, comprising a frame adapted to move along a vehicle to be washed, liquid spraying means on said frame for spraying liquid on the vehicle, power means for moving said frame and liquid spraying means along the vehicle, and control means operative to cause said liquid spraying means to spray liquid onto an end of the vehicle for a predetermined time so as to spray a predetermined amount more liquid onto the end of the vehicle than onto its midportion.

16. Vehicle washing apparatus as set forth in claim 15 and wherein said control means is responsive to arrival of said spraying means at said end of the vehicle for causing said liquid spraying means to spray more liquid onto said end of the vehicle than onto its midportion.

17. Vehicle washing apparatus as set forth in claim 16 and wherein said control means is operative to delay the movement of said frame along the vehicle at an end of the vehicle longer than at its midportion and with said liquid spray means functioning so as to spray more liquid onto said end of the vehicle than onto its midportion.

18. Vehicle washing apparatus comprising a frame adapted to straddle a vehicle, means mounting said frame for movement along a path, power means for moving said frame along said path, liquid spraying means connected to said frame for spraying liquid on a vehicle as said frame moves along said path, said power means including reversible motor means adapted to be driven continuously in one direction or the other for moving said frame back and forth along said path, reversing means for reversing said motor means upon the arrival of said frame at each end of said path, delaying means for delaying the return of said frame after it has arrived at each end of said path and actuated said reversing means, a drive wheel connected to said frame, a sprocket on said wheel, said delaying means including a chain drivingly connecting said motor to said sprocket, and movable idler sprockets connected to said frame, said chain being trained around said idler sprockets.

References Cited

UNITED STATES PATENTS

| 2,676,600 | 4/1954 | Vani et al. | 134—123 |
| 3,339,565 | 9/1967 | Williams | 134—123 XR |
| 3,038,481 | 6/1962 | Brechtel | 134—123 XR |
| 3,187,359 | 6/1965 | Takeuchi | 134—123 XR |
| 3,259,138 | 7/1966 | Heinicke | 134—181 XR |
| 3,288,109 | 11/1966 | Smith et al. | 134—123 XR |

FOREIGN PATENTS 153,297 6/1963 U.S.S.R.

ROBERT L. BLEUTGE, Primary Examiner

U.S. Cl. X.R.

134—181; 239—186